United States Patent
Miyoshi

(10) Patent No.: US 9,557,575 B2
(45) Date of Patent: Jan. 31, 2017

(54) IMAGE STABILIZATION APPARATUS, OPTICAL APPARATUS, AND IMAGING APPARATUS

(71) Applicant: CANON KABUSHIKI KAISHA, Tokyo (JP)

(72) Inventor: Kaori Miyoshi, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 990 days.

(21) Appl. No.: 13/713,337

(22) Filed: Dec. 13, 2012

(65) Prior Publication Data

US 2013/0170039 A1    Jul. 4, 2013

(30) Foreign Application Priority Data

Dec. 16, 2011 (JP) ................ 2011-275211
Dec. 16, 2011 (JP) ................ 2011-275213

(51) Int. Cl.
| | |
|---|---|
| *G02B 27/64* | (2006.01) |
| *G03B 17/00* | (2006.01) |
| *H04N 5/228* | (2006.01) |
| *G03B 5/02* | (2006.01) |
| *H04N 5/232* | (2006.01) |
| *G03B 5/06* | (2006.01) |

(52) U.S. Cl.
CPC ............ *G02B 27/646* (2013.01); *G03B 5/02* (2013.01); *G03B 5/06* (2013.01); *H04N 5/23248* (2013.01)

(58) Field of Classification Search
CPC ............ G02B 7/00; G02B 7/02; G02B 7/023; G02B 27/64; G02B 27/644; G02B 27/646; G03B 5/00; G03B 5/02; G03B 5/06; G03B 5/08; H04N 5/23248
See application file for complete search history.

(56) References Cited

U.S. PATENT DOCUMENTS

| | | | |
|---|---|---|---|
| 6,011,927 A | 1/2000 | Kamata | |
| 7,783,179 B2 | 8/2010 | Takahashi | |
| 7,933,076 B2 | 4/2011 | Ito | |
| 8,077,410 B2 | 12/2011 | Masuki | |
| 8,334,909 B2 | 12/2012 | Shirono | |
| 2010/0309324 A1* | 12/2010 | Shirono | H04N 5/23248 348/208.11 |

(Continued)

FOREIGN PATENT DOCUMENTS

| | | |
|---|---|---|
| JP | H1090744 A | 4/1998 |
| JP | 2007108557 A | 4/2007 |

(Continued)

OTHER PUBLICATIONS

Office Action issued in KR10-2012-0139331, mailed Jun. 19, 2015. English translation provided.

(Continued)

*Primary Examiner* — Thong Nguyen
(74) *Attorney, Agent, or Firm* — Rossi, Kimms & McDowell LLP

(57) ABSTRACT

An image stabilization unit includes a lens holder that holds a correction lens and is relatively movably provided with respect to a base member, first and second drive devices or a drive device group that drive the lens holder, and three supports that support the lens holder relative to the base member.

14 Claims, 7 Drawing Sheets

(56) References Cited

U.S. PATENT DOCUMENTS

2011/0013283 A1* 1/2011 Sato .................... G02B 27/646
                                                                                           359/557

FOREIGN PATENT DOCUMENTS

| JP | 2007219338 A | 8/2007 |
|----|--------------|--------|
| JP | 2007-232980 A | 9/2007 |
| JP | 2008122532 A | 5/2008 |
| JP | 2008191266 A | 8/2008 |
| JP | 2008244708 A | 10/2008 |
| JP | 2009122544 A | 6/2009 |
| JP | 2009128841 A | 6/2009 |
| JP | 2009169359 A | 7/2009 |
| JP | 2010164925 A | 7/2010 |

OTHER PUBLICATIONS

Office Action issued in JP2011-275211, mailed Oct. 27, 2015. English translation provided.
Office Action issued in JP2011-275213, mailed Oct. 27, 2015. English translation provided.
Office Action issued in Japanese Appln. No. 2011-275213 mailed May 24, 2016. English translation provided.

* cited by examiner

IMAGE STABILIZATION APPARATUS, OPTICAL APPARATUS, AND IMAGING APPARATUS

BACKGROUND OF THE INVENTION

1. Field of the Disclosure

The present disclosure relates to an image stabilization apparatus, an optical apparatus including the same, and an imaging apparatus.

2. Description of the Related Art

There has been proposed an imaging apparatus including an image stabilization apparatus that prevents image blur caused by an unintentional movement of hands during hand-held shooting. Japanese Patent Laid-Open No. 2007-219338 discloses an imaging apparatus including an image stabilization apparatus integrated with a light quantity regulating drive unit. The image stabilization apparatus provided in the imaging apparatus disclosed in Japanese Patent Laid-Open No. 2007-219338 includes a drive magnet that is integrally displaceable with a correction lens and a coil that displaces the drive magnet by an electromagnetic force. The image stabilization apparatus includes a feedback system constituted by a microcomputer, a coil, and a Hall element and repeatedly provides electricity through the coil while calculating the position of a correction lens holder after electricity is provided through the coil at a constant cycle to thereby perform camera-shake correction. The correction lens is brought into pressurized contact with a base serving as a fixing unit via a rolling ball.

Also, Japanese Patent Laid-Open No. 2007-232980 discloses a camera-shake correction device that detects a camera-shake amount and performs rotation/linear control of a movable unit provided in an X-Y movable stage in response to the detected camera-shake amount. The camera-shake correction device includes four ball bearings for holding the distance between the movable unit provided in the X-Y movable stage and a fixing unit at a certain level. Also, the camera-shake correction device includes a plurality of electromagnetic actuators that are driven in the X direction or the Y direction.

However, in the image stabilization apparatus disclosed in Japanese Patent Laid-Open No. 2007-219338, if an attempt to increase output (torque) by increasing the size of an electromagnetic actuator (magnet 21a and coil 22a) is made, it becomes difficult to ensure a ball receiving surface supporting a movable unit. In other words, in the image stabilization apparatus disclosed in Japanese Patent Laid-Open No. 2007-219338, the ball receiving surface needs to be ensured, and thus, the output of the electromagnetic actuator cannot be increased. Also, in the image stabilization apparatus, the size of each of the drive magnet and the coil is appropriately set so as to be drivable within a predetermined range required for correcting image blur depending on the weight of the movable unit including the correction lens. In other words, if the movable unit is heavy or the amount of movement required for correcting image blur becomes large, the sizes of both the drive magnet and the coil tend to be increased by that amount. Consequently, the entire image stabilization apparatus cannot be reduced in size.

Also, in the camera-shake correction device disclosed in Japanese Patent Laid-Open No. 2007-232980, four ball bearings are arranged at locations avoiding the electromagnetic actuator. In other words, the camera-shake correction device is supported by four points. However, the plane is geometrically defined by three points. Hence, the fourth point becomes a non-contact point unless the fourth point is configured as precise as possible. If the error in position at the fourth point occurs, the camera-shake correction device may be brought into contact or non-contact with the fourth point. Thus, the camera-shake correction device disclosed in Japanese Patent Laid-Open No. 2007-232980 is supported by four points, resulting in a rattling movement each time the movable unit is driven.

Furthermore, in the camera-shake correction device disclosed in Japanese Patent Laid-Open No. 2007-232980, a plurality of electromagnetic actuators is provided. Hence, if the camera-shake correction device is supported by three points provided at locations avoiding these electromagnetic actuators, the following problem may arise. In other words, the support position can only be provided at an unbalanced position relative to the centroid of the movable unit or the support position must be arranged on the outer side or the inner side of the electromagnetic actuators. Consequently, the entire device is increased in size.

SUMMARY OF THE INVENTION

The present disclosure provides an image stabilization apparatus that is capable of stably moving/supporting a movable unit with respect to a fixing unit while suppressing the size in the radial direction from the center of the movable unit and being adapted to increase the output of an actuator.

According to an aspect of the present disclosure, an image stabilization apparatus is provided that includes a correction member that corrects image blur; a base member; a movable member that holds the correction member and is relatively movably provided with respect to the base member in a predetermined direction perpendicular to an optical axis; a first drive device or a drive device group that moves the movable member in a first direction; a second drive device or a drive device group that moves the movable member in a second direction; and three supports that support the movable member relative to the base member, wherein at least one of the three supports is provided at a position overlapping with the first drive device or the second drive device as viewed from the direction of the optical axis.

Further features of the present disclosure will become apparent from the following description of exemplary embodiments with reference to the attached drawings.

DESCRIPTION OF THE EMBODIMENTS

Figure 1:
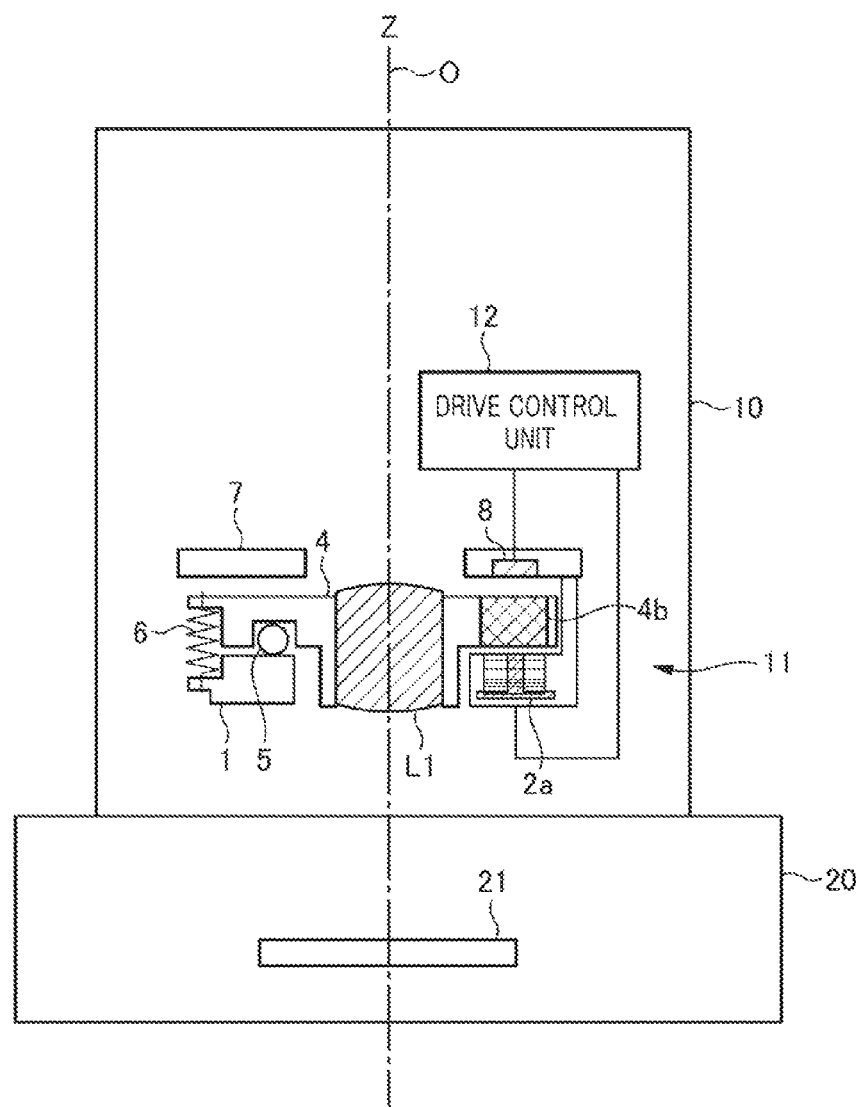
FIG. 1 is a view showing an example of the configuration of the imaging apparatus of the present embodiment.

FIG. 1 is a view showing an example of the configuration of the imaging apparatus of the present embodiment. In the following description, a plane perpendicular to the optical axis along which a movable unit is movable is defined as a XY-plane. The optical axis is taken along the Z direction.

The imaging apparatus shown in FIG. 1 is a camera having a lens barrel 10 and a camera body 20. The lens barrel 10 includes an image stabilization unit 11 and a drive control unit 12. The camera body 20 includes an image pickup device 21. The image stabilization unit 11 shifts a correction lens L1 in a plane perpendicular to an optical axis O to thereby correct image blur. In the present embodiment, the correction lens L1 functions as a correction member that corrects image blur. The lens barrel 10 has a lens group that forms an optical system together with the correction lens L1.

The image pickup device 21 is an image sensor that captures the object image obtained by the optical system provided in the lens barrel 10. The image pickup device 21 includes a CCD (Charge Coupled Device) image sensor or a CMOS (Complementary Metal Oxide Semiconductor) image sensor.

Figure 2:
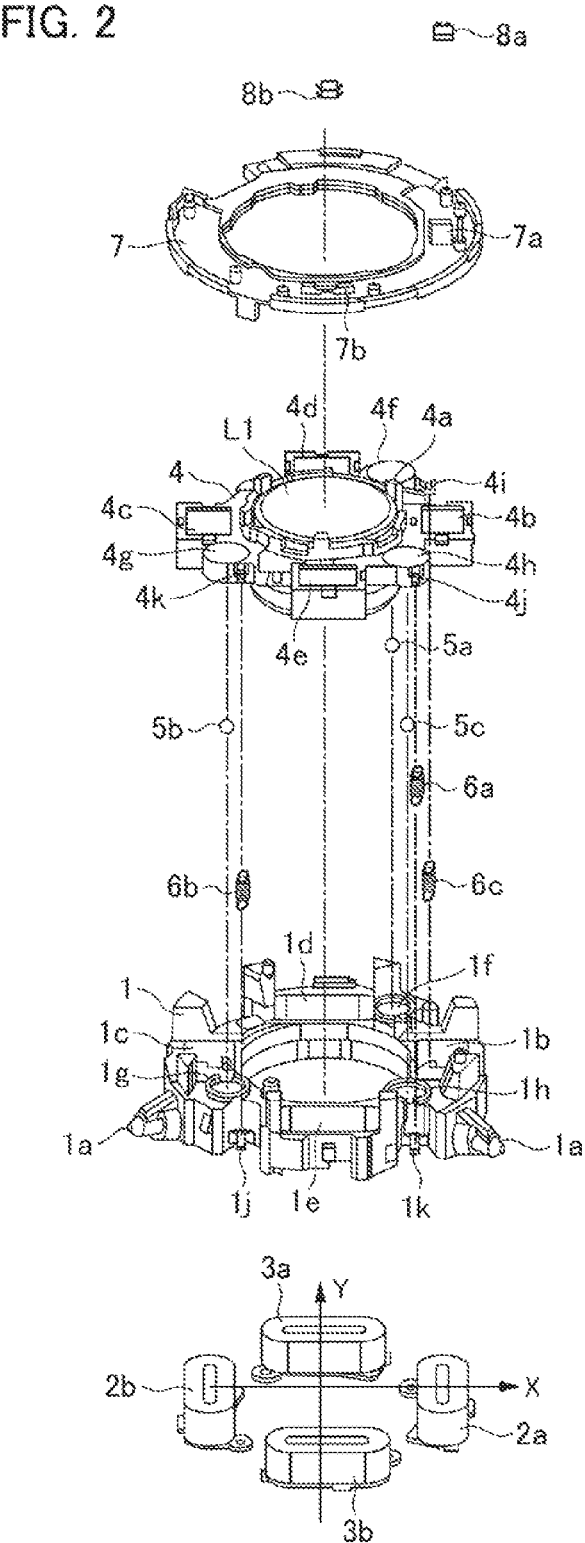
FIG. 2 is an exploded perspective view showing an image stabilization unit.
Figure 3:
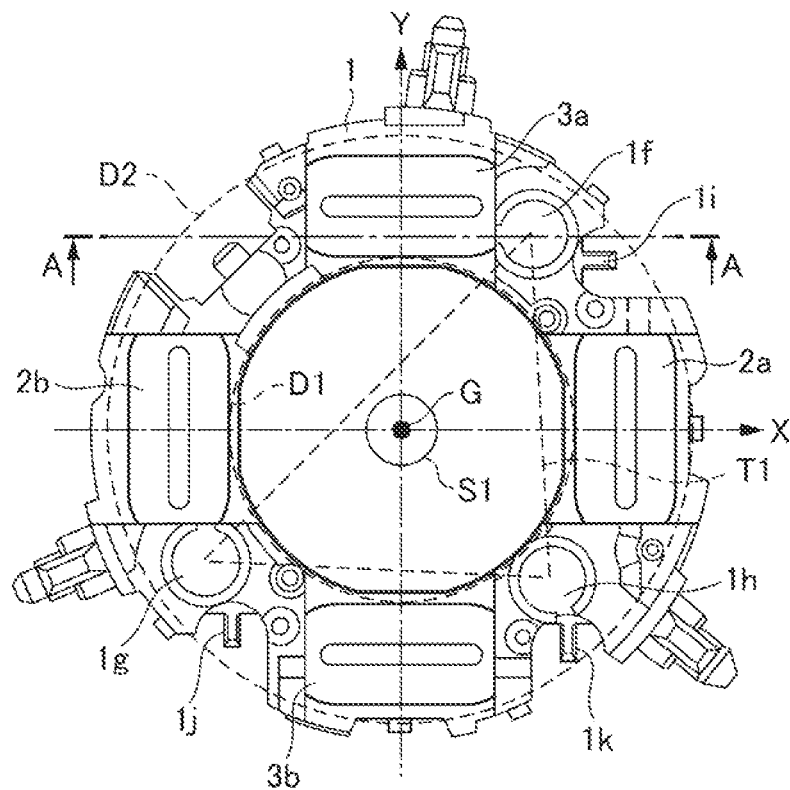
FIG. 3 is a top plan view showing the base member of the image stabilization unit.
Figure 4:
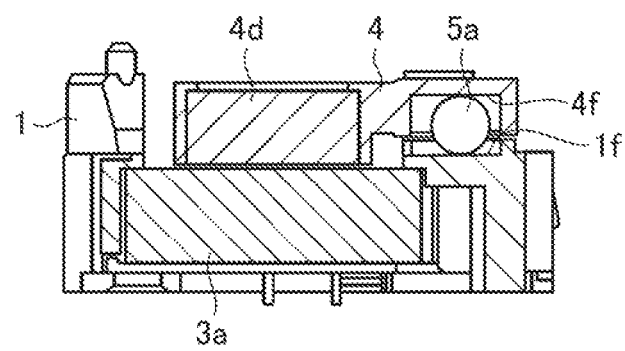
FIG. 4 is a cross-sectional view showing the image stabilization unit taken along the line A-A of FIG. 3.
Figure 5A:
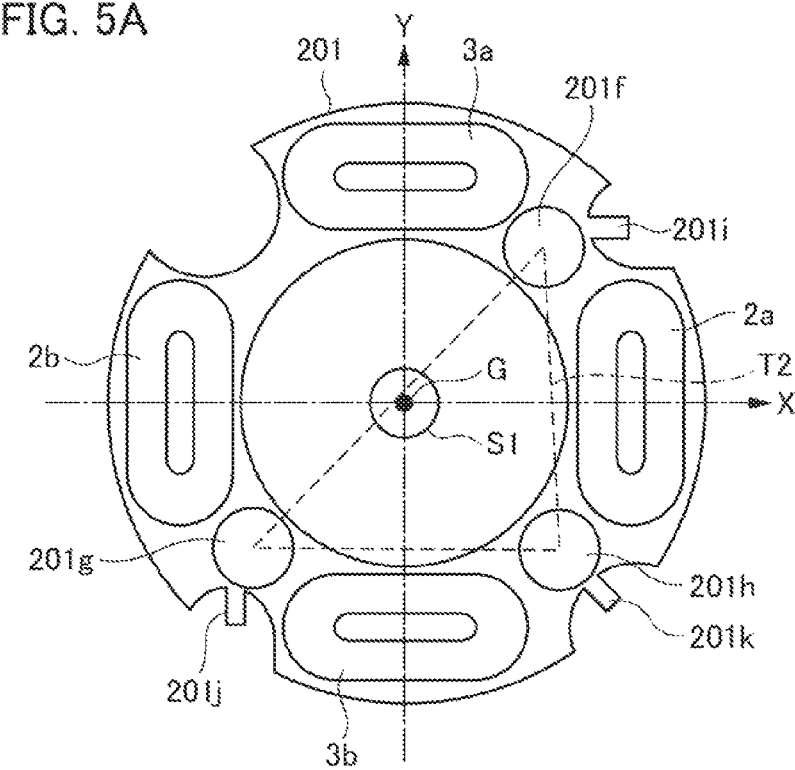
FIGS. 5A and 5B are top plan views schematically showing the base member and other components.
Figure 5B:
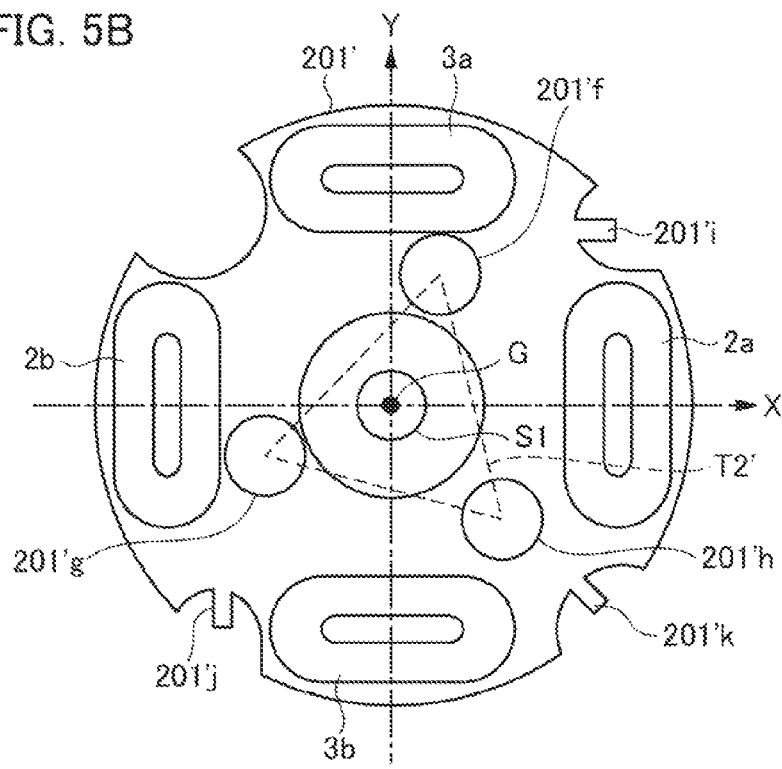

FIG. 2 is an exploded perspective view showing an image stabilization unit. FIG. 3 is a top plan view showing the base member of the image stabilization unit. In FIG. 3, the components other than a base member 1 are schematically shown as required. FIG. 4 is a cross-sectional view showing the image stabilization unit taken along the line A-A of FIG. 3. FIGS. 5A and 5B are top plan views schematically showing the base member and other components.

The image stabilization unit 11 shifts the correction lens L1 in a first direction and a second direction in a plane perpendicular to the optical axis O to thereby correct image blur caused by an unintentional movement of hands. The first direction (hereinafter referred to as "X direction") and the second direction (hereinafter referred to as "Y direction") are orthogonal to each other.

The image stabilization unit 11 includes a first drive device group having two first drive coils 2a and 2b (see FIG. 3) that drive the correction lens L1 in the X direction (first direction). The first drive coils 2a and 2b are two drive devices that are provided at opposing positions so as to sandwich the correction lens L1. Also, the image stabilization unit 11 includes a second drive device group having two second drive coils 3a and 3b that drive the correction lens L1 in the Y direction (second direction). The second drive coils 3a and 3b are also two drive devices that are provided at opposing positions so as to sandwich the correction lens L1. The first drive device group and second drive device group are driven controlled independent of one another.

In addition to the correction lens L1, the image stabilization unit 11 includes a base member 1, two first drive coils 2a and 2b, two second drive coils 3a and 3b, a lens holder 4, three balls 5a to 5c, three tension springs 6a to 6c, a sensor holder 7, and two Hall elements 8a and 8b. The first drive coils 2a and 2b are also collectively described as a "first drive coil 2". The second drive coils 3a and 3b are also collectively described as a "second drive coil 3". The balls 5a to 5c are ball members and are also collectively described as a "ball 5". The tension spring 6a to 6c are also collectively described as a "tension spring 6".

The base member 1 is interlocked with other lens groups (not shown) so as to be movable along the optical axis O. The base member 1 has three followers 1a provided on the outer periphery thereof. The followers 1a respectively engage with cam grooves provided on a cam cylinder (not shown) so as to be movable along the optical axis O following the cam grooves.

Furthermore, the base member 1 is provided with coil holding frames 1b, 1c, 1d, and 1e for holding a drive coil to be described below. The drive coil is fixed by the coil holding frames. Also, the base member 1 is provided with ball receiving surfaces 1f, 1g, and 1h each of which serving as a ball rolling surface to be described below.

Also, the base member 1 is provided with a first engaging section 1i, a second engaging section 1j, and a third engaging section 1k having a hook shape, respectively, for locking three urging members to be described below. The first engaging section 1i is also referred to as first engaging section 201i, 201'i, 301i, and 401i. The second engaging section 1j is also referred to as second engaging section 201j, 201'j, 301j, and 401j. The third engaging section 1k is also referred to as third engaging section 201k, 201'k, 301k, and 401k. The engaging sections lock the tension spring 6 to be described below, respectively.

The first drive coils 2a and 2b are held by two coil holding frames 1b and 1c that are provided on the base member 1 in the first direction (the X direction). The second drive coils 3a and 3b are held by two coil holding frames 1d and 1e that are provided on the base member 1 in the second direction (the Y direction).

The lens holder 4 is a movable member that holds the correction lens L1 and is relatively movably provided with respect to the base member 1 in a direction not parallel to the optical axis O, i.e., in a direction perpendicular to the optical axis. The lens holder 4 holds the correction lens L1 using a lens holding unit 4a provided on the center thereof. A first magnet 4b and a second magnet 4c that are magnetic members magnetized with two poles are integrally formed on the outer periphery of the correction lens L1 on the X axis. The second magnet 4c is arranged so as to sandwich the optical axis O with respect to the first magnet 4b.

Also, a third magnet 4d and a fourth magnet 4e that are magnetized with two poles are integrally formed on the outer periphery of the correction lens L1 on the Y axis. The fourth magnet 4e is arranged so as to sandwich the optical axis O with respect to the third magnet 4d. The first magnets 4b and 4c face the first drive coils 2a and 2b, respectively. Also, the second magnets 4d and 4e face the second drive coils 3a and 3b, respectively.

When a current flows through the first drive coils 2a and 2b, a magnetic force is generated. Consequently, the first magnet 4b and the second magnet 4c receive a magnetic attraction force or a magnetic repulsion force under the influence between the generated magnetic force and the magnetic force of the first magnet 4b and the second magnet 4c. With this arrangement, the first magnet 4b and the second magnet 4c receive the driving force along the X direction so that the lens holder 4 can move in parallel to the X direction. The currents flowing through the first coils 2a and 2b may be the same or different.

Likewise, when a current flows through the second drive coils 3a and 3b, a magnetic force is generated. Consequently, the third magnet 4d and the fourth magnet 4e receive a magnetic attraction force or a magnetic repulsion force under the influence between the generated magnetic force and the magnetic force of the third magnet 4d and the fourth magnet 4e. With this arrangement, the third magnet 4d and the fourth magnet 4e receive the driving force along the Y direction so that the lens holder 4 can move in parallel to the Y direction. The currents flowing through the second coils 3a and 3b may be the same or different.

Ball holding frames 4f, 4g, and 4h are provided at positions opposing to the ball receiving surfaces 1f, 1g, and 1h of the base member 1, respectively. The ball 5 slides within the ball holding frame. The ball holding frame also serves as the receiving surface of the ball 5 in the direction of the optical axis. Also, the base member 1 includes a first engaging section 4i, a second engaging section 4j, and a third engaging section 4k having a hook shape, respectively, for locking the tension spring 6.

Three balls 5a to 5c are arranged so as to be sandwiched between the base member 1 and the lens holder 4. Although the ball 5a only is shown in FIG. 4, each of the balls 5b and 5c is also arranged so as to be sandwiched between the base member 1 and the lens holder 4 in a similar manner.

As shown in FIG. 4, the ball 5a is sandwiched between the ball receiving surface if of the base member 1 and the flat portion within the concaved ball holding frame 4f of the lens holder 4 in the direction of the optical axis. The lens holder 4 is movably held with respect to the base member 1 with the aid of the rolling friction of the ball. In other words, the balls and the ball receiving surfaces function as three supports that support the lens holder 4 with respect to the base member 1. The ball receiving surface functions as a sliding surface on which the ball 5 is slid. The ball 5a rolls in association with the movement of the lens holder 4, and its rolling range is restricted by the outer wall (restricting wall) of the ball holding frame 4f of the lens holder 4. In other words, the restricting wall that restricts the movement of the ball 5 in the sliding surface is provided on the outer periphery of the sliding surface. The size of the ball receiving surface if of the base member 1 is larger than the rolling range within which the ball 5a is in contact with the ball receiving surface 1f. The reason why the outer wall is provided on the lens holder 4 side instead of the ball receiving surface 1f side of the base member 1 will be described below.

The tension spring 6 functions as an urging unit that urges the base member 1 and the lens holder 4 in a direction in which the ball 5 is sandwiched, i.e., in a direction parallel to the optical axis O. More specifically, the base member 1 and the lens holder 4 are urged by hooking the ends of the tension springs 6a, 6b, and 6c respectively to the engaging sections 1i, 1j, and 1k provided in the base member 1 and the engaging sections 4i, 4j, and 4k provided in the lens holder 4. Also, the arrangement relation among the three tension springs 6 is made such that the center position of the resultant force applied by the three tension springs 6 lies within a triangle T1 (to be described below) formed by connecting the three ball receiving surfaces.

The sensor holder 7 (see FIG. 1) is a component that holds the Hall element 8 and is fixed to the base member 1. The Hall element 8 is a magnetic sensor that detects a magnetic field. The first Hall element 8a shown in FIG. 2 is provided at a position opposite the first magnet 4a formed in the lens holder 4 at a predetermined distance. The first Hall element 8a detects changes in magnetic force caused by the movement of the first magnet 4b in association with the movement of the lens holder 4 to thereby detect the position of the lens holder 4 in the X direction.

The second Hall element 8b is provided at a position opposite the fourth magnet 4e formed in the lens holder 4 at a predetermined distance. The second Hall element 8b detects changes in magnetic force caused by the movement of the fourth magnet 4e in association with the movement of the lens holder 4, and then detects the position of the lens holder 4 in the Y direction to thereby output the detected position to the drive control unit 12.

Upon an image stabilization operation, the drive control unit 12 calculates the position of the correction lens L1 based on the signal output by the Hall element 8. Then, the drive control unit 12 calculates the drive quantity of the correction lens L1 based on the calculated position of the correction lens L1 and camera-shake information obtained by a camera-shake sensor (not shown), and supplies a drive current to the first drive coil 2 and the second drive coil 3.

Upon start of photographing, the drive control unit 12 firstly performs a centering operation that moves the correction lens L1 to the initial position. The initial position is the position at which the optical axis of the correction lens L1 matches the optical axis of another lens group that forms an optical system. By performing the centering operation, the range within which the correction lens L1 is movable by the image stabilization operation during photographing is substantially the same in all the directions so that an effective image stabilization operation can be performed for any type of camera-shake during photographing. When the image stabilization operation is not performed, photographing is performed while holding the correction lens L1 at the initial position.

Next, a detailed description will be given of the reason why the positioning locations of the ball receiving surfaces 1f, 1g, and 1h of the ball 5 are provided in the base member 1 and the restricting wall that restricts the rolling of the ball member 5 is provided in the lens holder 4 with reference to FIGS. 3 to 6.

FIG. 3 is a schematic top plan view showing the base member provided in the image stabilization apparatus of the first embodiment. In the first embodiment, as shown in FIG. 4, the ball receiving surface 1f is provided at a position partially overlapping the second drive coil 3a as viewed from the direction of the optical axis. Likewise, the ball receiving surface 1g is provided at a position partially overlapping the first drive coil 2b as viewed from the direction of the optical axis.

The triangle T1 shown in FIG. 3 is a triangle defined by connecting the centers of the ball receiving surfaces 1f, 1g, and 1h. A point G is a centroid position when the lens holder 4 is at the initial position. The symbol S1 denotes the range where the centroid position G of the lens holder 4 lies within the movable range of the lens holder 4. In this example, the first drive coil 2 and the second drive coil 3 are disposed outside the diameter D1 and inside the diameter D2 centered on the optical axis O. The diameter D1 is the diameter of an opening, which is required for relatively moving the lens holder 4 with respect to the base member 1, provided in the base member 1 centered on the optical axis O. The diameter D2 is, for example, the outer diameter of the base member 1 or the outer diameter of the image stabilization unit 11. In this example, the ball receiving surfaces 1f, 1g, and 1h that function as three supports are also disposed outside the diameter D1 and inside the diameter D2. It is preferable that the diameter D2 is made as small as possible in order to reduce the size of the image stabilization unit.

In the first embodiment, the positions of the ball receiving surfaces 1f, 1g, and 1h are determined such that the range S1 lies within the triangle T1 shown in FIG. 3. In other words, the centroid G of the lens holder 4 is included within the triangle connecting three supports for supporting the base member 1. With this arrangement, the lens holder 4 is stably movable with respect to the base member 1 (fixing unit).

Here, assume that the ball receiving surfaces are in positions as shown in FIG. 5A. In FIG. 5A, the base member 1 is represented by the reference numeral 201, and the ball receiving surfaces are represented by the reference numerals 201f, 201g, and 201h, respectively. If an attempt is made to provide the ball receiving surfaces 201f, 201g, and 201h at positions not overlapping the coil in the direction of the optical axis, the range S1 extends beyond the triangle T2 formed by connecting the three ball receiving surfaces 201f, 201g, and 201h. This indicates the fact that the lens holder 4 may be inclined by being unstably supported if the lens holder 4 is in a position extending beyond the triangle T2 as a result of movement, and thus, it is not preferred.

Also, assume that the ball receiving surfaces are arranged at positions as shown in FIG. 5B. In FIG. 5B, the component corresponding to the base member 1 is represented by the base member 201', and the ball receiving surfaces are represented by the reference numerals 201'f, 201'g, and 201'h, respectively. In the example shown in FIG. 5B, the ball receiving surfaces 201'f to 201'h are provided at positions which are not overlapped with the drive coils 2 and 3 and are adjacent in the radial direction. The range S1 can be formed without extending beyond the triangle T2' formed by connecting the three ball receiving surfaces 201'f, 201'g, and 201'h. However, in the base member 201' shown in FIG. 5B, the ball receiving surfaces are provided spreading in the radial direction, resulting in an increase in size of the image stabilization unit.

In the first embodiment, the ball receiving surfaces are arranged at positions described with reference to FIG. 3 and FIG. 4. In other words, at least one of the three ball receiving surfaces is provided at a position overlapping with the first drive coil 2 included in the first drive device group or the second drive coil 3 included in the second drive device group as viewed from the direction of the optical axis O. With this arrangement, the image stabilization unit 11 can not only be reduced in size but also stably hold the movable lens holder 4. In addition, the ball receiving surfaces are in positions overlapping the drive coil as viewed from the direction of the optical axis, and thus, the size of the drive coil can be ensured, resulting in a sufficiently large output of an actuator.

Furthermore, in the first embodiment, the region in which the ball receiving surface overlaps with the drive coil in the direction of the optical axis is intended to be the region other than the region where a magnetic force is generated in the magnet drive direction when a current flows through the drive coil.

Figure 6:
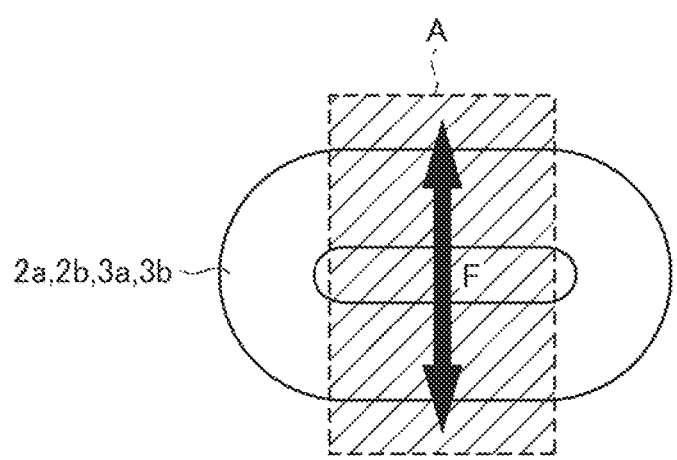
FIG. 6 is a top plan view showing a drive coil.

FIG. 6 is a top plan view showing a drive coil. The symbol A refers to the region of a coil that generates a magnetic force for exerting a driving force with respect to the drive direction F of the magnet. The magnet provided in the lens holder 4 has the size of the region A so as to efficiently obtain a driving force. In the present embodiment, the ball receiving surface is provided in a region avoiding the region A shown in FIG. 6 so that the ball receiving surface can be provided without sacrificing the size of a drive magnet.

Next, a description will be given of the reason why a restricting wall that restricts the rolling range of the ball member 5 is provided at the lens holder 4 side. The restricting wall needs to have a thickness by an amount corresponding to the thickness of the outer periphery of the ball rolling portion. In other words, the size of each of the restricting walls 4f, 4g, and 4h in the plane direction perpendicular to the optical axis thereof is larger than that of each of the ball receiving surfaces 1f, 1g, and 1h.

In the present embodiment, the size of the drive coil is larger than that of the magnet corresponding to the drive coil (the same applies to other embodiments). Thus, a space available for use other than a magnet can be readily ensured on the lens holder 4 side (the component side on which a magnet is disposed) than the base member 1 side (the component side on which a coil is disposed). For this reason, in the present embodiment, the restricting wall of the ball member 5, which requires a large space, is provided on the lens holder 4. In other words, the restricting wall is provided on a movable member on which a magnetic member is arranged. With this arrangement, the degree of freedom in designing the ball receiving surfaces can be increased, and this configuration can contribute to miniaturization.

In the present embodiment, the ball receiving surfaces are arranged such that the central position of the resultant urging force urged by three tension springs 6 is in the interior of the triangle T1. With this arrangement, the lens holder 4 is further stably supported by the base member 1 and is movable thereto.

Figure 7:
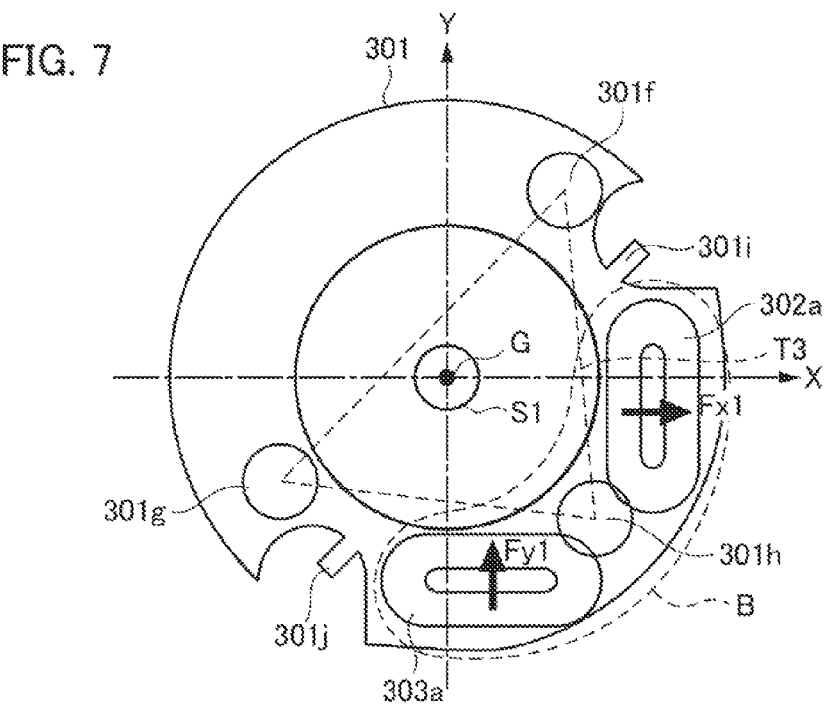
FIG. 7 is a schematic top plan view showing the base member provided in an image stabilization apparatus according to a second embodiment.

FIG. 7 is a schematic top plan view showing a base member having two engaging sections 301i and 301j, provided in an image stabilization apparatus according to a second embodiment. In the second embodiment, the image stabilization unit includes two drive coils that drive in the X direction and the Y direction. In other words, the image stabilization unit includes two actuators in total. The size of each actuator becomes large as compared with the configuration of the first embodiment described with reference to FIG. 3. However, in the second embodiment, the actuators can be collected at one portion of a correction lens instead of extending across the entire outer periphery thereof. Thus, the second embodiment is advantageous in that a barrel component other than an image stabilization unit can be disposed on the outer periphery of the correction lens L1.

The members other than those shown in FIG. 7 are the same as those described in the first embodiment. The same reference numerals are used to denote the same elements as those in the first embodiment, and the reference numerals corresponding to the first embodiment are used for the elements that are changed from the first embodiment. For example, in the second embodiment, reference numeral corresponding to 1a in the first embodiment is 301a. The mechanism of the image stabilization unit and the components provided therein are the same as those in the first embodiment except that the number of actuators is reduced from two to one, and thus, a description for the same components as those of the first embodiment will be omitted.

A first coil 302a and a magnet corresponding to the first coil 302a collectively function as a first drive device. The first drive device drives the lens holder 4 in the X direction. A second coil 303a and a magnet corresponding to the second coil 303a collectively function as a second drive device. The second drive device drives the lens holder 4 in the Y direction. The first coil 302a and the second coil 303a are provided at opposing positions so as to sandwich any one of three supports. In this example, the first coil 302a and the second coil 303a are provided at opposing positions so as to sandwich the ball receiving surface 301h.

The central vector Fx1 of the thrust force applied by the first coil 302a and the central vector Fy1 of the thrust force applied by the second coil 303a do not pass through the optical axis O. In other words, in the second embodiment, the first coil and the second coil are in a close positional relationship with respect to each other as compared with the relationship between the positions of the first coil and the second coil in the first embodiment. With this arrangement, an area (area B shown in FIG. 7) required for arranging two actuators can be configured to be small while the size (output) of each actuator is as large as possible.

Furthermore, in the present embodiment, the relationship between positions of the drive coil and the ball receiving surface is overlapped with each other as viewed from the direction of the optical axis (see FIG. 4). In other words, at least one (in the example shown in FIG. 7, the ball receiving surface 301*h*) of the three ball receiving surfaces 301*f* to 301*h* is provided at a position overlapping with the first coil 302*a* or the second coil 303*a* as viewed from the direction of the optical axis. More specifically, the ball receiving surface 301*h* is provided at a position overlapping with the first coil 302*a* and the second coil 303*a* as viewed from the direction of the optical axis. With this arrangement, the first coil and the second coil are located close to each other, resulting in a reduction in size of the image stabilization unit.

In the present embodiment, the positions of the ball receiving surfaces 301*f*, 301*g*, and 301*h* are determined such that the range S1 lies within a triangle T3 shown in FIG. 7. In other words, the centroid G of the lens holder 4 is included within the triangle connecting three supports for supporting the base member 1. With this arrangement, the lens holder 4 is stably movable with respect to a base member 301 (fixing unit).

The positioning location of the ball receiving surfaces 301*f*, 301*g*, and 301*h* is not limited to the positioning location shown in FIG. 7. Two of the three ball receiving surfaces may be adapted to be overlapped with the drive coil. According to the image stabilization apparatus of the second embodiment, the ball receiving surface(s) that can stably hold a lens holder can be arranged while the size of the drive device can be made as large as possible within the image stabilization apparatus.

Figure 8:
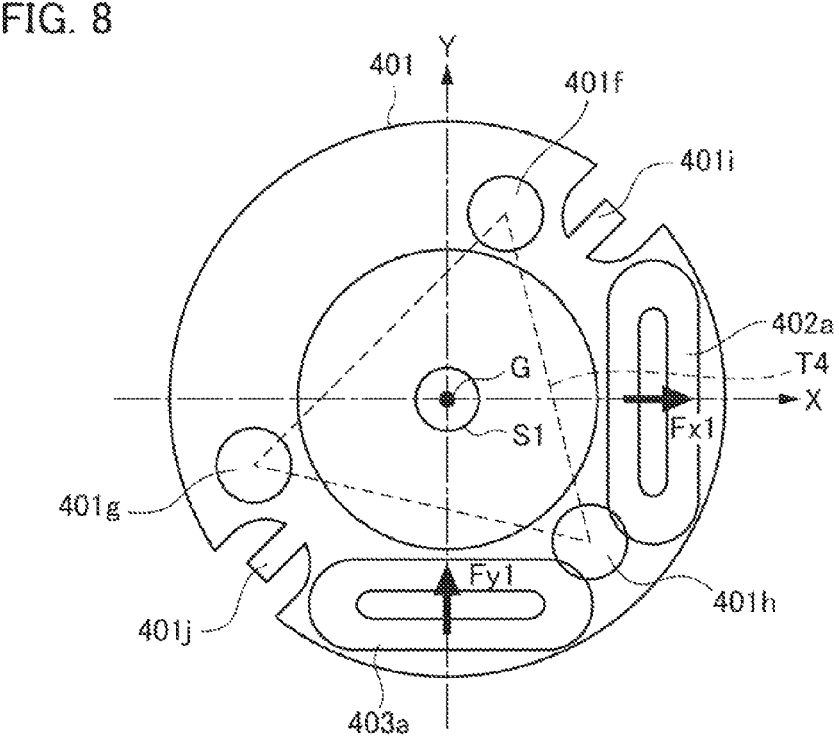
FIG. 8 is a schematic top plan view showing the base member provided in an image stabilization apparatus according to a third embodiment.

FIG. 8 is a schematic top plan view showing a base member having two engaging sections 401*i* and 401*j*, provided in an image stabilization apparatus according to a third embodiment. As in the second embodiment, the image stabilization unit also includes two drive coils that drive in the X direction and the Y direction in the second embodiment. The size of each actuator unit becomes large as compared with the configuration of the first embodiment described with reference to FIG. 3. However, in the third embodiment, the actuator units can be collected at one portion of a correction lens instead of extending across the entire outer periphery thereof. Thus, the third embodiment is advantageous in that a barrel component other than an image stabilization unit can be disposed on the outer periphery of the correction lens L1.

The members other than those shown in FIG. 8 are the same as those described in the first embodiment. The same reference numerals are used to denote the same elements as those in the first embodiment, and the reference numerals corresponding to the first embodiment are used for the elements that are changed from the first embodiment. For example, in the third embodiment, reference numeral corresponding to 1*a* in the first embodiment is 401*a*. The mechanism of the image stabilization unit and the components provided therein are the same as those in the first embodiment except that the number of actuator units is reduced from two to one, and thus, a description for the same components as those of the first embodiment will be omitted.

The central vector Fx1 of the thrust force applied by the first coil 402*a* and the central vector Fy1 of the thrust force applied by the second coil 403*a* pass through the optical axis O. With this arrangement, the size of the drive coil can be made as large as possible.

When an attempt is made to provide a ball receiving surface so as not to overlap with a drive coil as viewed from the direction of the optical axis, the first drive coil 302 cannot bring closer to the second drive coil 303 as shown in FIG. 8. Thus, the size of the drive coil must be decreased or the image stabilization apparatus itself must be increased in size. However, in the third embodiment, the relationship between positions of the drive coil and the ball receiving surface is overlapped with each other as viewed from the direction of the optical axis (see FIG. 4), and thus, the first coil and the second coil can be arranged to be as close as possible. With this arrangement, an image stabilization unit having a drive device with high actuator output can be provided.

At least one (in the example shown in FIG. 8, the ball receiving surface 401*h*) of the three ball receiving surfaces 401*f* to 401*h* is provided at a position overlapping with the first coil 402*a* or the second coil 403*a* as viewed from the direction of the optical axis. More specifically, the ball receiving surface 401*h* is provided at a position overlapping with the first coil 402*a* and the second coil 403*a* as viewed from the direction of the optical axis. With this arrangement, the first coil and the second coil are located close to each other, resulting in a reduction in size of the image stabilization unit.

In the present embodiment, the positions of the ball receiving surfaces 401*f*, 401*g*, and 401*h* are determined such that the range S1 lies within a triangle T4 shown in FIG. 8. In other words, the centroid G of the lens holder 4 is included within the triangle formed by connecting three supports for supporting the base member 1. With this arrangement, the lens holder 4 is stably movable with respect to a base member 401 (fixing unit).

The positioning location of the ball receiving surfaces 401*f*, 401*g*, and 401*h* shown in FIG. 8 may also be arranged such that two of the three ball receiving surfaces may be adapted to be overlapped with the drive coil. Ball receiving surfaces can be arranged at positions overlapping with coils, resulting in an increase in the degree of freedom in designing the ball receiving surfaces. Consequently, the ball receiving surfaces can be arranged at positions which can stably hold the lens holder 4.

The image stabilization apparatus of the third embodiment has an advantage in that the ball receiving surfaces that can stably hold a lens holder can be arranged while the size of the drive devices can be made as large as possible within the image stabilization apparatus.

Figure 9:
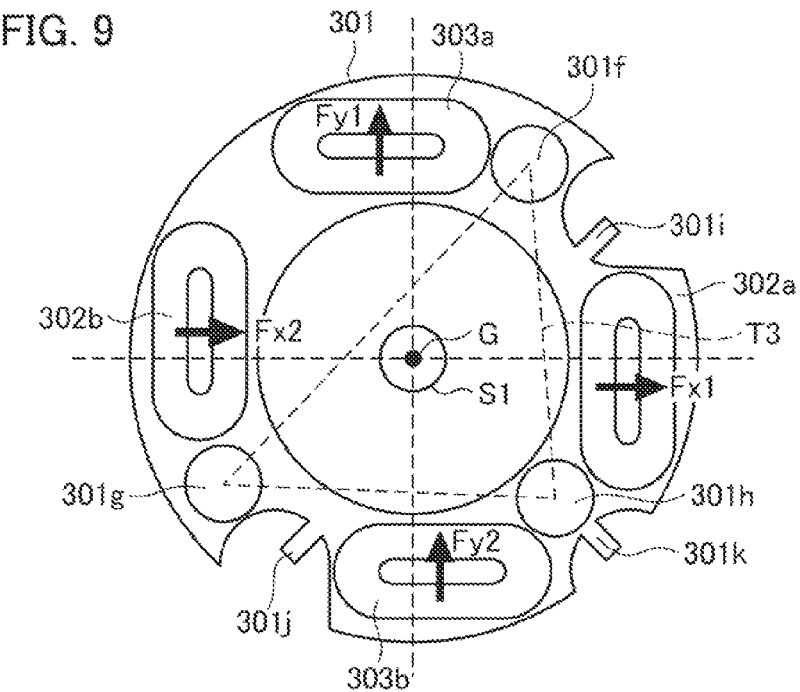
FIG. 9 is a view showing the configuration of the base member provided in an image stabilization apparatus according to a fourth embodiment.

FIG. 9 is a view showing the configuration of a base member having three engaging sections 301*i*, 301*j*, and 301*k*, according to a fourth embodiment. Hereinafter, a description will be given of the positional relationship among the first coils 302*a* and 302*b*, the second coils 303*a* and 303*b*, and the ball receiving surfaces 301*f*, 301*g*, and 301*h* in the base member 301 with reference to FIG. 9.

The members other than those shown in FIG. 9 are the same as those described in the first embodiment. The same reference numerals are used to denote the same elements as those in the first embodiment, and the reference numerals corresponding to the first embodiment are used for the elements that are changed from the first embodiment. For example, in the fourth embodiment, reference numeral corresponding to 1*a* in the first embodiment is 301*a*. The components provided in the image stabilization unit of the fourth embodiment are the same as those provided in the image stabilization unit of the first embodiment.

The first coils 302a and 302b are provided at positions in a rotary-symmetrical relation at 180 degrees about the optical axis O. The central vector Fx1 of the thrust force applied by the first coil 302a and the central vector Fx2 of the thrust force applied by the second coil 302b are on a straight line not passing through the optical axis O. The thrust force central vector is the central vector of the drive output by the coil. In the present embodiment, the drive output of the first coil 302a is set to be the same as that of the first drive coil 302b, and thus, the resultant force of the two drive outputs obtained by flowing current through the coils is a vector passing through the optical axis O. In other words, the central vector of the resultant force of the thrust forces applied by the first coils 302a and 302b passes through the optical axis O. With this arrangement, the lens holder 4 moves in the predetermined X direction.

Likewise, the second drive coil 303a and the second drive coil 303b are provided at positions in a rotary-symmetrical relation at 180 degrees about the optical axis O. The central vector Fy1 of the thrust force applied by the second coil 303a and the central vector Fy2 of the thrust force applied by the second coil 303b are on a straight line not passing through the optical axis O. In the present embodiment, the drive output of the second drive coil 303a is set to be the same as that of the second drive coil 303b, and thus, the resultant force of the two drive outputs obtained by flowing current through the coils is a vector passing through the optical axis O. In other words, the central vector of the resultant force of the thrust forces applied by the second coils 303a and 303b passes through the optical axis O. With this arrangement, the lens holder 4 moves in the predetermined Y direction.

The image stabilization unit of the fourth embodiment has the arrangement relation and output relation as described above because the movable unit (lens holder) is subject to shift movement in the X direction and the Y direction in a plane perpendicular to the optical axis O. However, if an image stabilization unit is structured so as to make a movable unit itself freely shift and rotate, the present disclosure is not limited to the aforementioned arrangement relation and output relation (the same applies to the third embodiment to be described below).

As shown in FIG. 9, the triangle T3 formed by connecting the centers of the ball receiving surfaces 301f, 301g, and 301h includes the centroid movable range S1 of the lens holder 4. This is achieved by the fact that the space for the ball receiving surfaces can be ensured by arranging the first drive coil 302 and the second drive coil 303 to be offset in the image stabilization unit. In the image stabilization unit of the fourth embodiment, the triangle T3 includes the centroid movable range S1. Thus, the image stabilization unit 11 can be made smaller in size and can stably hold the lens holder 4 without bringing the ball receiving surfaces adjacent to the coils in a radial direction with respect to the image stabilization apparatus.

The image stabilization unit of the fourth embodiment also has the following feature. In the image stabilization unit, the drive coils included in each of the first drive coil 302 and the second drive coil 303 are disposed to be biased in the X direction or the Y direction. With this arrangement, the space in which the drive coil is not arranged can be efficiently ensured, and the space can be efficiently used as the space for inserting a component extending from a component adjacent to an image stabilization unit.

As in the first embodiment, a ball receiving surface may also be provided at a position overlapping with a drive coil as viewed from the direction of the optical axis. With this arrangement, the space can further be efficiently used and the arrangement can be made such that the ball receiving surfaces stably hold a lens holder.

Figure 10:
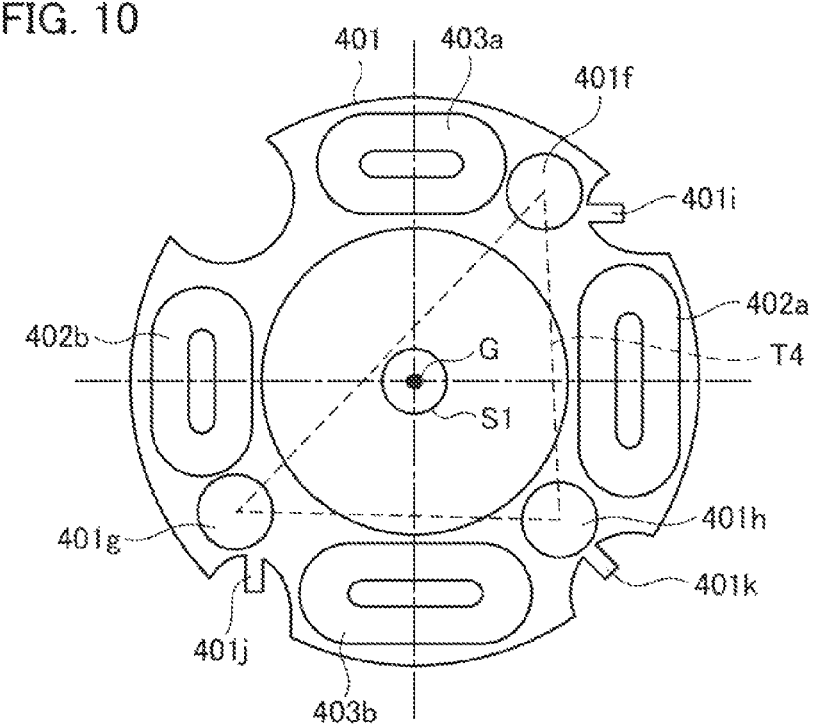
FIG. 10 is a view showing the configuration of the base member provided in an image stabilization apparatus according to a fifth embodiment.

FIG. 10 is a view showing the configuration of a base member having three engaging sections 401i, 401j, and 401k, according to a fifth embodiment. Hereinafter, a description will be given of the positional relationship among the first drive coils 402a and 402b, the second drive coils 403a and 403b, and the ball receiving surfaces 401f, 401g, and 401h in the base member 401 with reference to FIG. 10.

The members other than those shown in FIG. 10 are the same as those described in the first embodiment. The same reference numerals are used to denote the same elements as those in the first embodiment, and the reference numerals corresponding to the first embodiment are used for the elements that are changed from the first embodiment. For example, in the fifth embodiment, reference numeral corresponding to 1a in the first embodiment is 401a. The components provided in the image stabilization unit of the fifth embodiment are the same as those provided in the image stabilization unit of the first embodiment.

As shown in FIG. 10, the first drive coils 402a and 402b are provided at positions such that the central vector of the thrust force applied by each of the first drive coils 402a and 402b passes through the optical axis O. Also, the size of the first drive coil 402a is different from that of the first drive coil 402b. With this arrangement, both of the thrust force central vectors pass through the optical axis O despite the fact that two first drive coils have different drive outputs. Consequently, the lens holder 4 stably moves in the predetermined X direction by the resultant drive force generated by the two first drive coils.

Also, the second drive coils 403a and 403b are provided at positions such that the central vector of the thrust force applied by each of the second drive coils 403a and 403b passes through the optical axis O. Also, the size of the second drive coil 403a is different from that of the second drive coil 403b. With this arrangement, both of the thrust force central vectors pass through the optical axis O despite the fact that two second drive coils have different drive outputs. Consequently, the lens holder 4 stably moves in the predetermined Y direction by the resultant drive force generated by the two second drive coils.

As shown in FIG. 10, the triangle T4 formed by connecting the centers of the ball receiving surfaces 401f, 401g, and 401h includes the centroid movable range S1 of the lens holder 4. This is achieved by the fact that the space for the ball receiving surfaces is ensured while ensuring the driving force by making the sizes of the first drive coils 402a and 402b appear to be different from each other and making the sizes of the second drive coils 403a and 403b appear to be different from each other.

In the image stabilization unit of the fifth embodiment, the triangle T4 includes the centroid movable range S1. Thus, the image stabilization unit can be made smaller in size and can stably hold the lens holder without bringing the ball receiving surfaces adjacent to the coils in a radial direction with respect to the image stabilization unit.

The image stabilization unit of the fifth embodiment also has the following feature. The drive output can be increased as high as possible and the space in which the drive coil is not arranged can be efficiently ensured by changing the sizes of two drive coils included in the first drive coil 402 and the sizes of two drive coils included in the second drive coil 403. More specifically, the space in which the drive coil is not arranged can be efficiently used as the space for inserting a component extending from a component adjacent to the image stabilization unit 11.

As in the first embodiment, a ball receiving surface may also be provided at a position overlapping with a drive coil as viewed from the direction of the optical axis. With this arrangement, the space can further be efficiently used and the arrangement can be made such that the ball receiving surfaces stably hold a lens holder.

The present disclosure is not limited to the embodiments described above but various modifications and variations can be made within the scope of the present disclosure. While, in the embodiments, a description has been given by taking an example in which image stabilization operation is performed by moving the correction lens L1, the present disclosure is not limited thereto. For example, an image stabilization unit may correct image blur by moving an image pickup device in a plane parallel to its image capturing surface. In other words, the image pickup device may also function as a correction member that corrects image blur.

In the embodiments, a description has been given by taking an example in which the Hall element 9 is used as a position detecting unit that detects the position of the correction lens L1. However, other magnetic sensors that sense magnetic field such as an MI (Magneto Impedance) sensor, magnetic resonance-type magnetic field detecting element, an MR (Magneto-Resistance) element, or the like may also be used as the position detecting unit. The position detecting unit is not limited to the above magnetic sensor, but an optical sensor that optically performs position detection may also be used.

Also, as an imaging apparatus including the image stabilization unit of the present embodiment, a description has been given by taking an example of a digital still camera for still image capturing, the imaging apparatus of the present embodiment is not limited thereto. The imaging apparatus may also be a film camera, a video camera for motion image capturing, or other types of imaging apparatus. The imaging apparatus may also be an optical apparatus such as an interchangeable lens for use in a digital single-lens reflex camera.

Aspects of the present disclosure can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2011-275211 filed Dec. 16, 2011, and Japanese Patent Application No. 2011-275213 filed Dec. 16, 2011, which are hereby incorporated by reference herein in their entirety.

What is claimed is:

1. An image stabilization apparatus comprising:
   a correction member that corrects image blur;
   a base member;
   a movable member that holds the correction member and is relatively movably provided with respect to the base member in a predetermined direction perpendicular to an optical axis;
   a first drive device that moves the movable member in a first direction and includes a first drive coil and a second drive coil;
   a second drive device that moves the movable member in a second direction which is different from the first direction and includes a third drive coil and a fourth drive coil; and
   three supports that are provided between the movable member and the base member,
   wherein the first drive coil and the second drive coil are arranged at positions sandwiching the correction member in a direction perpendicular to the optical axis,
   wherein the third drive coil and the fourth drive coil are arranged at positions sandwiching the correction member in a direction perpendicular to the optical axis,
   wherein a first support of the three supports is arranged at a position between the first drive coil and third drive coil in a direction perpendicular to the optical axis,
   wherein a second support of the three supports is arranged at a position between the second drive coil and fourth drive coil in a direction perpendicular to the optical axis,
   wherein a third support of the three supports is arranged at a position between the first drive coil and fourth drive coil in a direction perpendicular to the optical axis, and
   wherein the first support is arranged at a position overlapping a part of the third drive coil when viewed from the direction of the optical axis and the second support is arranged at a position overlapping a part of the second drive coil when viewed from the direction of the optical axis so that a centroid of the movable member is included in a triangle formed by connecting the three supports.

2. The image stabilization apparatus according to claim 1, wherein, when a diameter of an opening, which is required for relatively moving the movable member with respect to the base member, provided in the base member centered on the optical axis, is D1 and an outer diameter of the base member is D2, the first drive coil, the second drive coil, the third drive coil, the fourth drive coil, and the three supports are provided on an outer side of the D1 and an inner side of the D2.

3. The image stabilization apparatus according to claim 2, wherein each of the three supports has a ball member, the base member comprises a sliding surface which is a surface on which the ball member slides and is provided on the outer side of the D1 and the inner side of the D2, and at least a portion of the sliding surface is provided at a position overlapping with a part of the first drive device or a part of the second drive device as viewed from the direction of the optical axis.

4. The image stabilization apparatus according to claim 3, wherein a restricting wall that restricts the movement of the ball member in the sliding surface is provided on an outer periphery of the sliding surface, and the restricting wall is provided on the movable member.

5. The image stabilization apparatus according to claim 1, wherein the first and the second drive devices are arranged for preventing the passage of each of a central vector of a thrust force applied by the first drive device and a central vector of a thrust force applied by the second drive device from passing through the optical axis.

6. The image stabilization apparatus according to claim 1, wherein the first and the second drive devices are arranged for allowing passage of each of a central vector of a thrust force applied by the first drive device and a central vector of a thrust force applied by the second drive device to pass through the optical axis.

7. The image stabilization apparatus according to claim 1, wherein the first drive device includes the first coil, the second drive coil, a first magnetic member and a second magnetic member,
   wherein first thrust force central vector provided by the first drive coil and the first magnetic member does not pass through the optical axis,
   wherein second thrust force central vector provided by the second drive coil and the second magnetic member does not pass through the optical axis, and
   wherein resultant force of the first and second thrust force central vectors pass through the optical axis.

8. The image stabilization apparatus according to claim 1, wherein the first drive device includes the first coil, the second drive coil, a first magnetic member and a second magnetic member,
   wherein the second drive coil is smaller than the first drive coil,
   wherein first thrust force central vector provided by the first drive coil and the first magnetic member pass through the optical axis, and
   wherein second thrust force central vector provided by the second drive coil and the second magnetic member pass through the optical axis.

9. The image stabilization apparatus according to claim 1, further comprising:
   an urging unit that urges the movable member and the base member in a direction parallel to the optical axis,
   wherein a central position of a resultant urging force urged by the urging unit is included in the triangle formed by connecting the three supports.

10. The image stabilization apparatus according to claim 1, wherein the second direction is a direction perpendicular to the first direction.

11. The image stabilization apparatus according to claim 1, wherein the three supports each have a ball member and a restricting wall that restricts the movement of the ball member, and one of the three restricting walls is provided at a position such that a distance from an opening that is provided in a center of the base member is different from that of the respective others of the three restricting walls.

12. The image stabilization apparatus according to claim 1, wherein the third support is provided at positions that are not overlapped with the first drive coil, the second drive coil, the third drive coil, and the fourth drive coil when viewed from the direction of the optical axis.

13. An optical apparatus comprising:
   a correction member that corrects image blur;
   a base member;
   a movable member that holds the correction member and is relatively movably provided with respect to the base member in a predetermined direction perpendicular to an optical axis;
   a first drive device that moves the movable member in a first direction and includes a first drive coil and a second drive coil;
   a second drive device that moves the movable member in a second direction which is different from the first direction and includes a third drive coil and a fourth drive coil; and
   three supports that are provided between the movable member and the base member,
   wherein the first drive coil and the second drive coil are arranged at positions sandwiching the correction member in a direction perpendicular to the optical axis,
   wherein the third drive coil and the fourth drive coil are arranged at positions sandwiching the correction member in a direction perpendicular to the optical axis,
   wherein a first support of the three supports is arranged at a position between the first drive coil and third drive coil in a direction perpendicular to the optical axis,
   wherein a second support of the three supports is arranged at a position between the second drive coil and fourth drive coil in a direction perpendicular to the optical axis,
   wherein a third support of the three supports is arranged at a position between the first drive coil and fourth drive coil in a direction perpendicular to the optical axis, and
   wherein the first support is arranged at a position overlapping a part of the third drive coil when viewed from the direction of the optical axis and the second support is arranged at a position overlapping a part of the second drive coil when viewed from the direction of the optical axis so that a centroid of the movable member is included in a triangle formed by connecting the three supports.

14. An imaging apparatus comprising:
   a correction member that corrects image blur;
   a base member;
   a movable member that holds the correction member and is relatively movably provided with respect to the base member in a predetermined direction perpendicular to an optical axis;
   a first drive device that moves the movable member in a first direction and includes a first drive coil and a second drive coil;
   a second drive device that moves the movable member in a second direction which is different from the first direction and includes a third drive coil and a fourth drive coil; and
   three supports that are provided between the movable member and the base member,
   wherein the first drive coil and the second drive coil are arranged at positions sandwiching the correction member in a direction perpendicular to the optical axis,
   wherein the third drive coil and the fourth drive coil are arranged at positions sandwiching the correction member in a direction perpendicular to the optical axis,
   wherein a first support of the three supports is arranged at a position between the first drive coil and third drive coil in a direction perpendicular to the optical axis,
   wherein a second support of the three supports is arranged at a position between the second drive coil and fourth drive coil in a direction perpendicular to the optical axis,
   wherein a third support of the three supports is arranged at a position between the first drive coil and fourth drive coil in a direction perpendicular to the optical axis, and
   wherein the first support is arranged at a position overlapping a part of the third drive coil when viewed from the direction of the optical axis and the second support is arranged at a position overlapping a part of the second drive coil when viewed from the direction of the optical axis so that a centroid of the movable member is included in a triangle formed by connecting the three supports.

* * * * *